United States Patent
Ichikawa

(10) Patent No.: US 9,210,014 B2
(45) Date of Patent: Dec. 8, 2015

(54) CROSS-POLAR INTERFERENCE CANCELLATION SYSTEM, WIRELESS STATION DEVICE, WIRELESS COMMUNICATION METHOD

(75) Inventor: Masaki Ichikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 34 days.

(21) Appl. No.: 14/129,476

(22) PCT Filed: Jun. 22, 2012

(86) PCT No.: PCT/JP2012/066017
§ 371 (c)(1),
(2), (4) Date: Dec. 26, 2013

(87) PCT Pub. No.: WO2013/005585
PCT Pub. Date: Jan. 10, 2013

(65) Prior Publication Data
US 2014/0206291 A1    Jul. 24, 2014

(30) Foreign Application Priority Data

Jul. 1, 2011 (JP) ................................. 2011-146979

(51) Int. Cl.
*H04B 7/10* (2006.01)
*H04L 25/08* (2006.01)
(Continued)

(52) U.S. Cl.
CPC *H04L 25/08* (2013.01); *H04B 1/38* (2013.01); *H04B 7/10* (2013.01); *H04B 17/336* (2015.01); *H04B 17/382* (2015.01); *H04J 11/003* (2013.01); *H04L 1/0003* (2013.01); *H04L 27/0008* (2013.01); *H04W 52/42* (2013.01); *H04L 5/04* (2013.01)

(58) Field of Classification Search
CPC ...................................................... H04W 16/24
USPC .............................. 455/63.1, 447, 450, 452.2
See application file for complete search history.

(56) References Cited

U.S. PATENT DOCUMENTS 5,392,459 A * 2/1995 Baba et al. ...................... 455/69
2011/0286539 A1* 11/2011 Kawai ............................ 375/259

FOREIGN PATENT DOCUMENTS

| JP | 2-164149 A | 6/1990 |
| JP | 5-153083 A | 6/1993 |

(Continued)

OTHER PUBLICATIONS

International Search Report in PCT/JP2012/066017 dated Sep. 4, 2012 with English translation thereof.
Russian Notice of Allowance in Application No. 2014102950 dated Sep. 3, 2015 with English Translation.

*Primary Examiner* — Tuan H Nguyen
(74) *Attorney, Agent, or Firm* — McGinn IP Law Group, PLLC

(57) ABSTRACT

A wireless station device determines whether a carrier to noise ratio of a vertical polarization wave is lower than a first threshold value, determines that a present modulation method for the vertical polarization wave is to be changed to another modulation method having a small multilevel number when the carrier to noise ratio of the vertical polarization wave is lower than the first threshold value, and transmits modulation method information to the facing wireless station device. Further, the facing wireless station device transmits a radio signal to the wireless station device using the modulation method indicated by the received modulation method information for the vertical polarization wave.

10 Claims, 4 Drawing Sheets

(51) Int. Cl.
- *H04J 11/00* (2006.01)
- *H04L 1/00* (2006.01)
- *H04B 1/38* (2015.01)
- *H04B 17/336* (2015.01)
- *H04B 17/382* (2015.01)
- *H04W 52/42* (2009.01)
- *H04L 27/00* (2006.01)
- *H04L 5/04* (2006.01)

(56) References Cited

FOREIGN PATENT DOCUMENTS

| | | |
|---|---|---|
| JP | 2005-318533 A | 11/2005 |
| JP | 2005-341405 A | 12/2005 |
| JP | 2009-177459 A | 8/2009 |
| RU | 2173025 C1 | 8/2001 |
| WO | WO 2010/095566 A1 | 8/2010 |

* cited by examiner

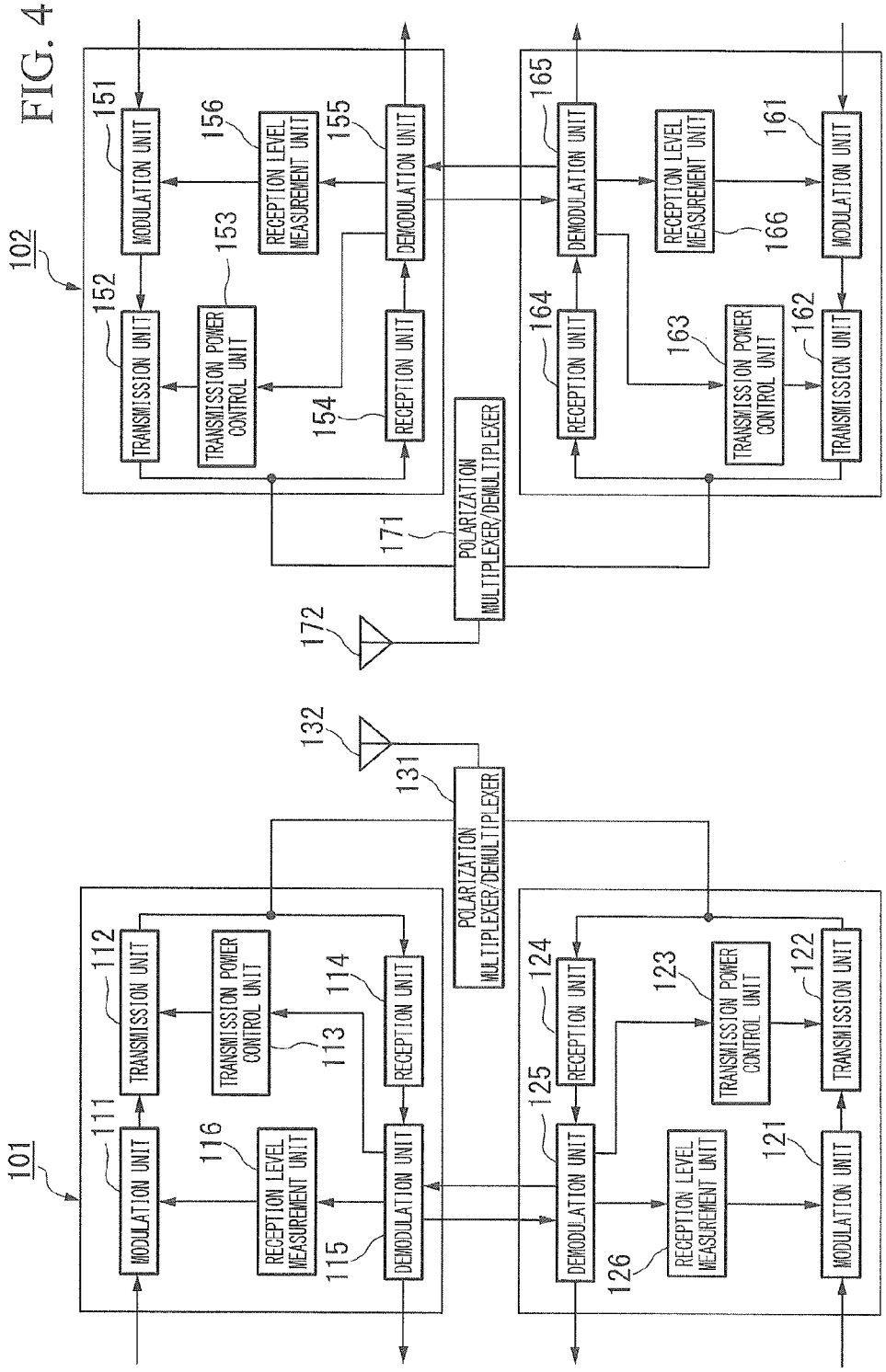

CROSS-POLAR INTERFERENCE CANCELLATION SYSTEM, WIRELESS STATION DEVICE, WIRELESS COMMUNICATION METHOD

TECHNICAL FIELD

The present invention relates to a cross-polar interference cancellation system, a wireless station device, and a wireless communication method.

BACKGROUND ART

FIG. 4 is a diagram illustrating a configuration of a related cross-polar interference cancellation system.

In the related cross-polar interference cancellation system as illustrated in FIG. 4, when two routes of microwave communication lines are formed using a vertical polarization wave (V-polarization wave) and a horizontal polarization wave (H-polarization wave) orthogonal to each other between facing wireless station devices, interference between cross-polarization waves occurs in a wireless station device on the reception side under an influence of fading. In order to remove this interference between cross-polarization waves, the wireless station device on the reception side may notify the transmission side of transmission power control information according to a reception situation, and the wireless station device on the transmission side may control transmission powers of the V-polarization wave and the H-polarization wave based on this transmission power control information.

In the cross-polar interference cancellation system of FIG. 4, reception level measurement units 156 and 166 of a wireless station device 102 detect a reception power of the V-polarization wave and a reception power of the H-polarization wave, respectively. Here, the reception level measurement units 156 and 166 transfer signals to each other. Accordingly, when the reception power of any one of the V-polarization wave and the H-polarization wave is reduced, control of the transmission powers of the V-polarization wave and the H-polarization wave is performed at the same time by transmitting the transmission power control information to the facing wireless station device and controlling the transmission power control units 113 and 123 at the same time such that control of the transmission powers of both of the V-polarization wave and the H-polarization wave can be performed at the same time. Further, related technologies are disclosed in Patent documents 1 and 2.

DOCUMENT OF THE PRIOR ART

Patent Documents

[Patent Document 1] Japanese Unexamined Patent Application, First Publication No. H2-164149
[Patent Document 2] Japanese Unexamined Patent Application, First Publication No. 2005-318533

DISCLOSURE OF INVENTION

Problems to be Solved by the Invention

However, in the cross-polarization wave interference cancellation system as described above, there is a problem in that the best interference compensation characteristic is not obtained for interference between cross-polarization waves.

For example, there are problems in that, in a state in which any one of the reception powers of the V-polarization wave and the H-polarization wave becomes small and a degree of cross-polarization identification of an antenna is degraded, an interference amount between the cross-polarization waves is increased, a compensation amount of an interference compensator on one polarization wave side is saturated, a signal of the polarization wave on the saturated side cannot be transmitted due to the saturation of the compensation amount, and a transmission capacity which is possible with both the polarization waves is reduced.

Therefore, an object of the present invention is to provide a cross-polar interference cancellation system, a wireless station device, and a wireless communication method which can solve the above-described problems.

Means for Solving the Problem

In order to achieve the above object, a cross-polar interference cancellation system in an embodiment of the present invention is a cross-polar interference cancellation system including a wireless station device which performs a transmission and reception process with a facing wireless station device in two channels using both of a vertical polarization wave and a horizontal polarization wave of a radio signal at the same frequency, wherein: the wireless station device determines whether a carrier to noise ratio of any one of the vertical polarization wave and the horizontal polarization wave is lower than a first threshold value of a carrier to noise ratio, determines that a present modulation method for any one of the vertical polarization wave and the horizontal polarization wave determined to be lower than the first threshold value of the carrier to noise ratio is to be changed to another modulation method having a small multilevel number when the carrier to noise ratio of any one of the vertical polarization wave and the horizontal polarization wave is lower than the first threshold value of the carrier to noise ratio, generates modulation method information indicating the other modulation method with a small multilevel number, and transmits the modulation method information indicating the other modulation method with a small multilevel number to the facing wireless station device, and the facing wireless station device receives the modulation method information indicating the other modulation method with a small multilevel number, and transmits a radio signal to the wireless station device using the modulation method indicated by the received modulation method information for the vertical polarization wave or the horizontal polarization wave determined to be lower than the first threshold value of the carrier to noise ratio in the wireless station device.

Further, a wireless station device in an embodiment of the present invention is a wireless station device which performs a transmission and reception process with a facing wireless station device in two channels using both of a vertical polarization wave and a horizontal polarization wave of a radio signal at the same frequency, wherein: the wireless station device determines whether a carrier to noise ratio of any one of the vertical polarization wave and the horizontal polarization wave is lower than a first threshold value of the carrier to noise ratio, determines that a present modulation method for any one of the vertical polarization wave and the horizontal polarization wave determined to be lower than the first threshold value of the carrier to noise ratio is to be changed to another modulation method having a small multilevel number when the carrier to noise ratio of any one of the vertical polarization wave and the horizontal polarization wave is lower than the first threshold value of the carrier to noise ratio, generates modulation method information indicating the other modulation method with a small multilevel number, and transmits the modulation method information indicating the other modulation method with a small multilevel number to the facing wireless station device.

Further, a wireless communication method in an embodiment of the present invention is a wireless communication method in a cross-polar interference cancellation system including a wireless station device which performs a transmission and reception process with a facing wireless station device in two channels using both of a vertical polarization wave and a horizontal polarization wave of a radio signal at the same frequency, wherein: the wireless station device determines whether a carrier to noise ratio of any one of the vertical polarization wave and the horizontal polarization wave is lower than a first threshold value of a carrier to noise ratio, determines that a present modulation method for any one of the vertical polarization wave and the horizontal polarization wave determined to be lower than the first threshold value of the carrier to noise ratio is to be changed to another modulation method having a small multilevel number when the carrier to noise ratio of any one of the vertical polarization wave and the horizontal polarization wave is lower than the first threshold value of the carrier to noise ratio, generates modulation method information indicating the other modulation method with a small multilevel number, and transmits the modulation method information indicating the other modulation method with a small multilevel number to the facing wireless station device, and the facing wireless station device receives the modulation method information indicating the other modulation method with a small multilevel number, and transmits a radio signal to the wireless station device using the modulation method indicated by the received modulation method information for the vertical polarization wave or the horizontal polarization wave determined to be lower than the first threshold value of the carrier to noise ratio in the wireless station device.

Further, a wireless communication method in an embodiment of the present invention is a wireless communication method in a wireless station device which performs a transmission and reception process with a facing wireless station device in two channels using both of a vertical polarization wave and a horizontal polarization wave of a radio signal at the same frequency, the method includes: determining whether a carrier to noise ratio of any one of the vertical polarization wave and the horizontal polarization wave is lower than a first threshold value of the carrier to noise ratio, determining that a present modulation method for any one of the vertical polarization wave and the horizontal polarization wave determined to be lower than the first threshold value of the carrier to noise ratio is to be changed to another modulation method having a small multilevel number when the carrier to noise ratio of any one of the vertical polarization wave and the horizontal polarization wave is lower than the first threshold value of the carrier to noise ratio, generating modulation method information indicating the other modulation method with a small multilevel number, and transmitting the modulation method information indicating the other modulation method with a small multilevel number to the facing wireless station device.

Effects of the Invention

According to a general cross-polar interference cancellation system, if only a reception level of one polarization wave is reduced and a reception CN value is reduced due to interference between cross-polarization waves, or the like, a signal is suspended and the signal of the one polarization wave cannot be transmitted at all, whereas according to the cross-polar interference cancellation system of the present invention, when the reception CN value is reduced, the tolerance against the interference is enhanced by reducing the multilevel number of the modulation method. In other words, in the modulation method before the multilevel number is reduced, no signal can be transmitted at all, but the signal can be passed by reducing the multilevel number, and a transmission capacity is reduced. However, a signal can be transmitted to some extent. Further, it is possible to perform transmission with a greater transmission capacity by determining the modulation method from the respective reception CN values independently in the V-polarization wave and the H-polarization wave.

BRIEF DESCRIPTION OF DRAWINGS

FIG. 4 is a block diagram illustrating a configuration of a cross-polar interference cancellation system related to an embodiment of the present invention.

EMBODIMENTS FOR CARRYING OUT THE INVENTION

Hereinafter, a cross-polar interference cancellation system according to an embodiment of the present invention will be described with reference to the drawings.

Figure 1:
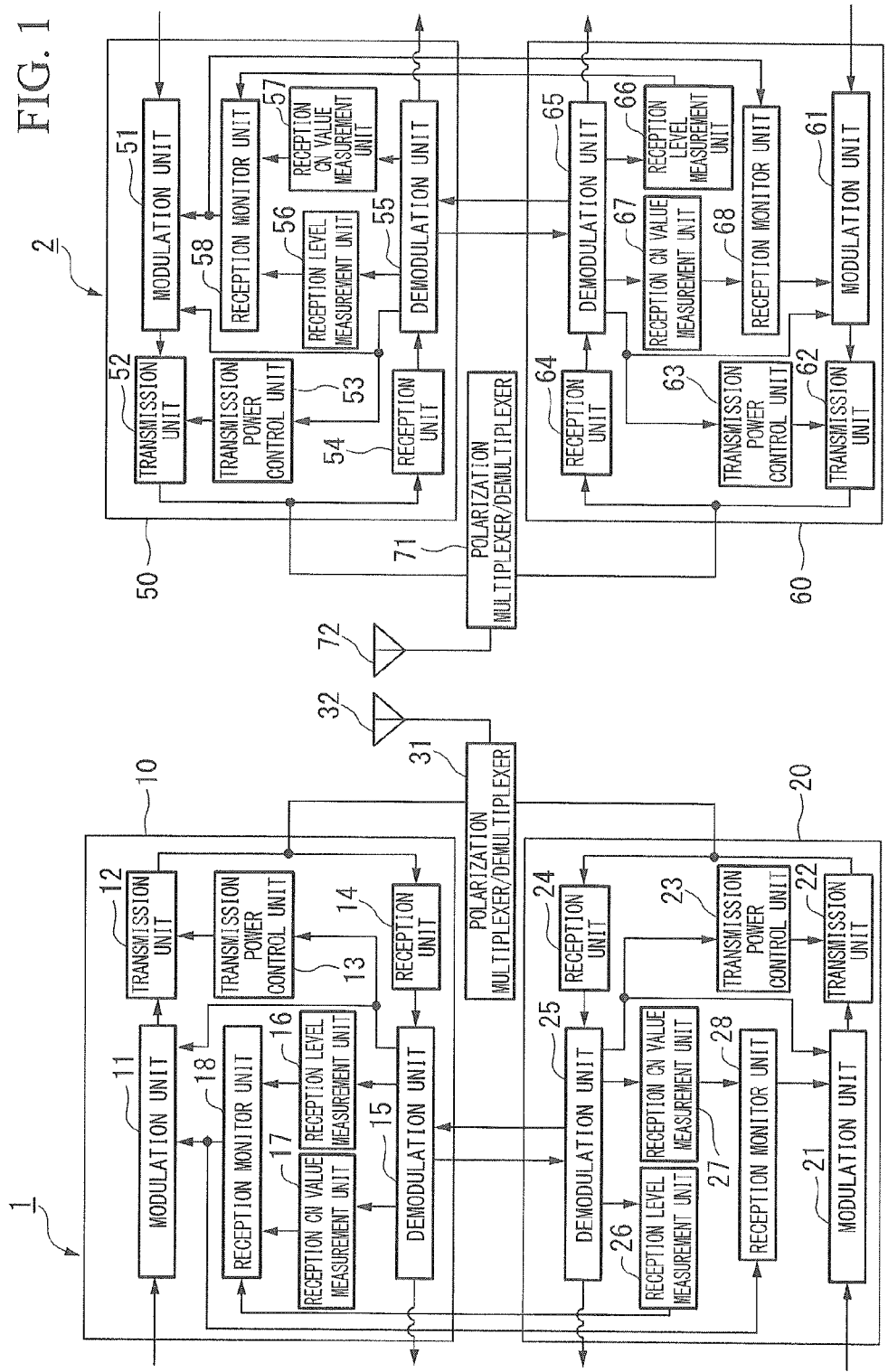
FIG. 1 is a block diagram illustrating a configuration of a cross-polar interference cancellation system according to an embodiment of the present invention.

FIG. 1 is a block diagram illustrating a configuration of a cross-polar interference cancellation system according to the present embodiment.

In FIG. 1, reference numbers 1 and 2 denote wireless station devices which face to transmit or receive a radio signal.

The wireless station device 1 and the wireless station device 2 use a both-polarization wave transmission scheme that is a radio signal transmission scheme using a V-polarization wave and an H-polarization wave as means for realizing improvement of frequency use efficiency.

Also, the wireless station device 1 in the present embodiment includes a V-polarization wave processing unit 10 and an H-polarization wave processing unit 20. Further, the wireless station device 2 includes a V-polarization wave processing unit 50 and an H-polarization wave processing unit 60.

The V-polarization wave processing unit 10 of the wireless station device 1 includes a modulation unit 11, a transmission unit 12, a transmission power control unit 13, a reception unit 14, a demodulation unit 15, a reception level measurement unit 16, a reception CN value measurement unit 17, and a reception monitor unit 18.

Further, the H-polarization wave processing unit 20 of the wireless station device 1 includes a modulation unit 21, a transmission unit 22, a transmission power control unit 23, a reception unit 24, a demodulation unit 25, a reception level measurement unit 26, a reception CN value measurement unit 27, and a reception monitor unit 28.

Further, the V-polarization wave processing unit 50 of the wireless station device 2 includes a modulation unit 51, a transmission unit 52, a transmission power control unit 53, a reception unit 54, a demodulation unit 55, a reception level measurement unit 56, a reception CN value measurement unit 57, and a reception monitor unit 58.

Further, the H-polarization wave processing unit 60 of the wireless station device 1 includes a modulation unit 61, a transmission unit 62, a transmission power control unit 63, a reception unit 64, a demodulation unit 65, a reception level measurement unit 66, a reception CN value measurement unit 67, and a reception monitor unit 68.

Here, since configurations of the V-polarization wave processing unit 10 of the wireless station device 1, the V-polarization wave processing unit 50 of the wireless station device 2, the H-polarization wave processing unit 20 of the wireless station device 1, and the H-polarization wave processing unit 60 of the wireless station device 2 are substantially the same, a schematic process of the wireless station device 1 or the wireless station device 2 will be described using configurations of the V-polarization wave processing unit 10 of the wireless station device 1 and the V-polarization wave processing unit 50 of the wireless station device 2.

First, when a signal is transmitted from the wireless station device 1 to the wireless station device 2, the polarization multiplexer/demultiplexer 31 of the wireless station device 1 combines a V-polarization wave output from the V-polarization wave processing unit 10 with an H-polarization wave output from the H-polarization wave processing unit 20, for a transmission wave, and transmits a resultant radio signal to the wireless station device 2 which is a facing station via the antenna 32. The wireless station device 2 includes an antenna 72 and a polarization multiplexer/demultiplexer 71 used in common by the V-polarization wave processing unit 50 and the H-polarization wave processing unit 60. Also, in the wireless station device 2, when a radio signal is received, its reception wave is separated into a V-polarization wave reception signal and an H-polarization wave reception signal by the polarization multiplexer/demultiplexer 71.

Next, the separated V-polarization wave reception signal is amplified and converted to a signal in an intermediate frequency band by the reception unit 54. Also, the demodulation unit 55 receives an output from the reception unit 54, demodulates the input signal into a digital signal, and outputs the digital signal as a demodulation baseband signal. Further, the reception level measurement unit 56 obtains a reception level from control information of the reception unit 54 and the demodulation unit 55 and sends this reception level to the reception monitor unit 58. Meanwhile, the reception CN value measurement unit 57 receives the demodulation baseband signal, calculates a reception CN value from this demodulation baseband signal, and outputs this reception CN value and reception modulation method information to the reception monitor unit 58.

Next, the reception monitor unit 58 monitors the reception level of the V-polarization wave, the modulation method information, and the reception CN value. Further, the reception monitor unit 58 receives a reception level of the H-polarization wave reception signal from the reception level measurement unit 66 of the H-polarization wave processing unit 60 and monitors the reception level of the H-polarization wave reception signal. Also, the reception monitor unit 58 generates the modulation method information indicating a modulation method for the radio signal, which is transmitted from the wireless station device 1 to the wireless station device 2 and transmission power information indicating the transmission power of the radio signal. Also, the reception monitor unit 58 of the wireless station device 2 superimposes the generated information (the modulation method information and the transmission power information) on the V polarization transmission signal transmitted from the wireless station device 2 to the wireless station device 1, and transmits the information to the wireless station device 1.

In the wireless station device 1, the demodulation unit 15 of the V-polarization wave processing unit 10 demodulates the V-polarization wave reception signal via the antenna 32, the polarization multiplexer/demultiplexer 31, and the reception unit 14. Also, the demodulation unit 15 extracts the modulation method information and the transmission power information transmitted from the wireless station device 2 and outputs the modulation method information to the modulation unit 11 and the transmission power information to the transmission power control unit 13. Also, the modulation unit 11 performs switching of a modulation method based on the input modulation method information. Further, the transmission power control unit 13 performs transmission power control based on the input transmission power information.

Further, the process in which the wireless station device 1 transmits the radio signal to the wireless station device 2 has been described in the process described above. Meanwhile, when the wireless station device 2 transmits a radio signal to the wireless station device 1, conversely, the V-polarization wave processing unit 10 of the wireless station device 1 generates the modulation method information and the transmission power information through a similar process and superimposes the information on the V polarization transmission signal to be transmitted to the wireless station device 2. Also, the V-polarization wave processing unit 50 of the wireless station device 2 performs switching control of the modulation method and the transmission power using the modulation method information and the transmission power information.

Further, the H-polarization wave processing unit 20 of the wireless station device 1 and the H-polarization wave processing unit 60 of the wireless station device 2 perform a similar process.

However, in the present embodiment, they differ in that the H-polarization wave processing unit 20 or the H-polarization wave processing unit 60 do not generate the transmission power information, the H-polarization wave processing unit 20 of the wireless station device 1 performs control of switching of the transmission power using the transmission power information extracted by the V-polarization wave processing unit 10, and the H-polarization wave processing unit 60 of the wireless station device 2 performs control of switching of the transmission power using the transmission power info Illation extracted by the V-polarization wave processing unit 50. Thus, the transmission powers of the V-polarization wave and the H-polarization wave can be made equal by the H-polarization wave processing unit 20 using an extraction result of the transmission power of the V-polarization wave processing unit 10 and by the H-polarization wave processing unit 60 using an extraction result of the transmission power of the V-polarization wave processing unit.

In other words, the cross-polar interference cancellation system according to the present embodiment is a cross-polar interference cancellation system including the wireless station device which performs a transmission and reception process with the facing wireless station device in two channels using both of the V-polarization wave and the H-polarization wave of the radio signal at the same frequency. Also, in this cross-polar interference cancellation system, the wireless station device 2 determines whether a reception CN value (a carrier to noise ratio) of any one of the V-polarization wave and the H-polarization wave is lower than a first threshold value. Further, when the reception CN value of any one of the V-polarization wave and the H-polarization wave is lower than the first threshold value, the wireless station device 2 determines that the present modulation method for any one of the V-polarization wave and the H-polarization wave determined to be lower than the first threshold value is to be changed to another modulation method having a small multilevel number. Further, the wireless station device 2 generates the modulation method information indicating the other modulation method with a small multilevel number. Further, the wireless station device 2 transmits the modulation method information indicating the other modulation method with a small multilevel number to the wireless station device 1. Also, the wireless station device 1 receives the modulation method information indicating the other modulation method with a small multilevel number and transmits a radio signal to the wireless station device 2 using the modulation method indicated by the received modulation method information for the V-polarization wave or the H-polarization wave determined to be lower than the first threshold value in the wireless station device 2.

Further, in the cross-polar interference cancellation system according to the present embodiment, the wireless station device 2 determines whether the reception level of any one of the V-polarization wave and the H-polarization wave is lower than a reception level threshold value. Also, when the reception level of any one of the V-polarization wave and the H-polarization wave is lower than the reception level threshold value, the wireless station device 2 generates transmission power information instructing to set a transmission level of the radio signal in the facing wireless station device 1 to be high. Further, the wireless station device 2 transmits the transmission power information to the wireless station device 1. Also, the wireless station device 1 receives the transmission power information, increases the transmission power based on the received transmission power information, and transmits the radio signal to the wireless station device 2.

Further, in the cross-polar interference cancellation system according to the present embodiment, if the reception level of any one of the V-polarization wave and the H-polarization wave is lower than the reception level threshold value even when the wireless station device 2 transmits the transmission power information to the wireless station device 1, the wireless station device 2 determines whether the reception CN value of any one of the V-polarization wave and the H-polarization wave is lower than a first threshold value.

Further, in the cross-polar interference cancellation system according to the present embodiment, when the reception level of any one of the V-polarization wave and the H-polarization wave is equal to or more than the reception level threshold value and the reception CN value of any one of the V-polarization wave and the H-polarization wave is equal to or more than a second threshold value higher than the first threshold value, the wireless station device 2 determines that a present modulation method for any one of the V-polarization wave and the H-polarization wave determined to be equal to or more than the second threshold value is to be changed to another modulation method with a number of phase shift values. Further, the wireless station device 2 generates modulation method information indicating the other modulation method with a number of phase shifts. Further, the wireless station device 2 transmits the modulation method information indicating the other modulation method with a number of phase shifts to the wireless station device 1. Also, the wireless station device 1 receives the modulation method information indicating the other modulation method with a number of phase shifts, and transmits the radio signal to the wireless station device using the modulation method indicated by the received modulation method information for the V-polarization wave or the H-polarization wave determined to be equal to or more than the second threshold value in the wireless station device 2.

Figure 2:
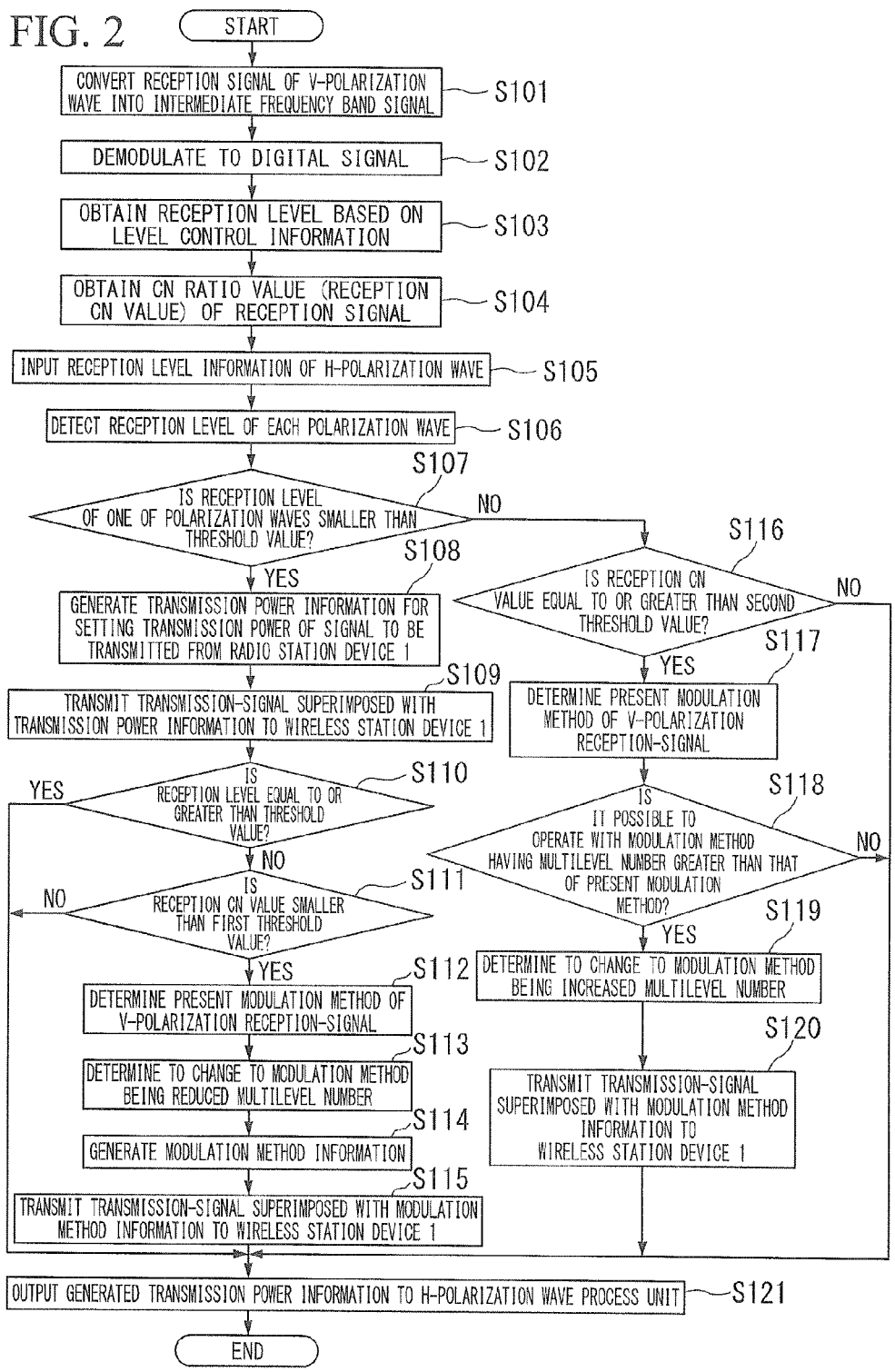
FIG. 2 is a diagram illustrating a process flow in a V-polarization wave processing unit of a wireless station device on the reception side according to an embodiment of the present invention.

FIG. 2 is a diagram illustrating a process flow in the V-polarization wave processing unit of the wireless station device on the reception side according to the embodiment.

Figure 3:
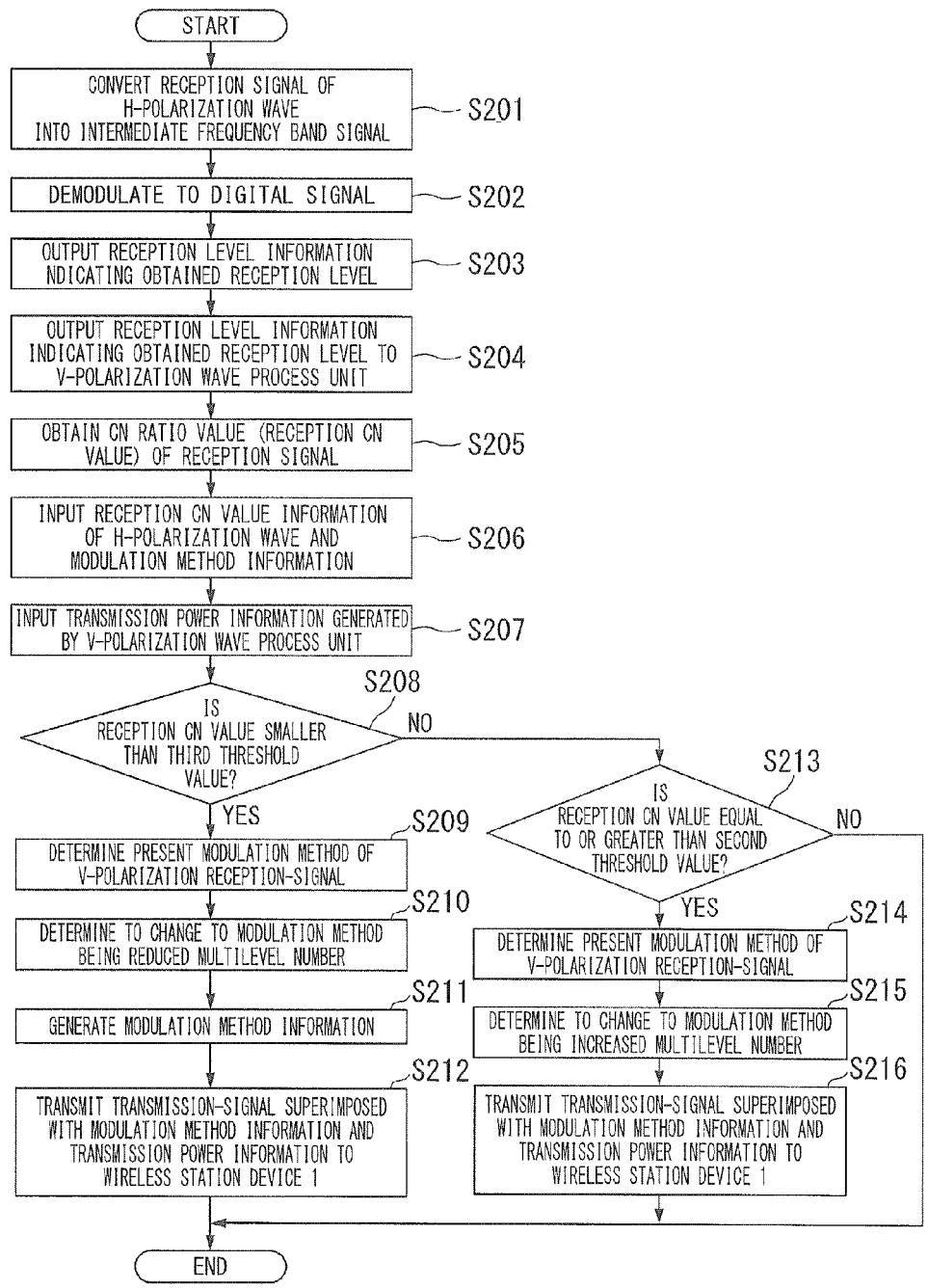
FIG. 3 is a diagram illustrating a process flow in an H-polarization wave processing unit of a wireless station device on the reception side according to an embodiment of the present invention.

FIG. 3 is a diagram illustrating a process flow in the H-polarization wave processing unit of the wireless station device on the reception side according to the same embodiment.

Next, details of operation of the cross-polar interference cancellation system according to the present embodiment will be described.

Transmission of the radio signal from the wireless station device 1 to the wireless station device 2 and transmission of the radio signal from the wireless station device 2 to the wireless station device 1 are independent, and the respective wireless station devices hold the same functional configurations for a function for a transmission process and a reception process. Therefore, in the present embodiment, the transmission of the radio signal from the wireless station device 1 to the wireless station device 2 will be described.

In the related cross-polar interference cancellation system, when one of the reception levels of the V-polarization wave and the H-polarization wave is reduced and the interference amount between cross-polarization waves becomes large, the compensation amount of the inter-cross-polarization wave interference compensator on the one polarization wave side is saturated. Accordingly, in the polarization wave on the saturated side, no signal transmission can be performed, and a transmission capacity which is possible with both polarization waves decreases.

However, in the cross-polar interference cancellation system according to the present embodiment, focusing on improving this point, interference tolerance is enhanced by reducing a multilevel number of the modulation using an adaptive modulation method in a cross-polarized interference system when the interference amount between cross-polarization waves becomes large.

Further, in the cross-polar interference cancellation system according to the present embodiment, difficulty in transmitting the signal of the polarization wave of which the reception CN value decreases is prevented by enhancing an interference tolerance against the interference between the cross-polarization waves by monitoring the CN (Carrier-to-Noise) value of each of the V-polarization wave and the H-polarization wave and reducing the multilevel number of the modulation method on the polarization wave side of which the reception CN value is reduced when the reception CN value is reduced.

Further, in the cross-polar interference cancellation system according to the present embodiment, since an interference amount between cross-polarization waves increases for only one polarization wave, the transmission capacity is further increased when a transmission state is bad by monitoring the reception CN values of the V-polarization wave and the H-polarization wave and performing switching of the modulation method for only the polarization wave of which the reception CN value is changed.

Here, the cross-polar interference cancellation system performs microwave communication in two routes using the V-polarization wave and the H-polarization wave orthogonal to each other. Further, this cross-polar interference cancellation system performs an adaptive modulation method to adaptively change the modulation method according to a state of a transmission path.

In the adaptive modulation method according to the present embodiment, the wireless station device on the reception side determines the modulation method for the radio signal transmitted from the facing wireless station device on the transmission side according to the reception state of the radio signal transmitted from the wireless station device on the transmission side. Further, for the transmission power control, the wireless station device on the reception side determines transmission power control for the radio signal transmitted from the facing wireless station device on the transmission side according to the reception state of the radio signal transmitted from the facing wireless station device on the transmission side. Accordingly, operation of the wireless station device on the reception side in the cross-polar interference cancellation system will first be described.

First, the wireless station device 1 is assumed to be on the transmission side, and the wireless station device 2 is assumed to be on the reception side.

In this case, the wireless station device 2 receives the radio signal transmitted from the wireless station device 1. In the wireless station device 2, the radio signal is received by the antenna 72 and separated into two reception signals of the V-polarization wave and the H-polarization wave by the polarization multiplexer/demultiplexer 71. Since configurations of the V-polarization wave processing unit 50 which processes the V-polarization wave and the H-polarization wave processing unit 60 which processes the H-polarization wave are substantially the same, operation in the V-polarization wave processing unit 50 will be described herein.

The reception signal of the V-polarization wave separated by the polarization multiplexer/demultiplexer 71 is amplified and converted to a signal in an intermediate frequency band by the reception unit 54 of the V-polarization wave processing unit 50 (step S101). Also, an output from the reception unit 54 is input to the demodulation unit 55. The demodulation unit 55 demodulates the input signal into a digital signal of QAM (quadrature amplitude modulation) (step S102), and outputs the digital signal as a demodulation baseband signal. Also, the reception level measurement unit 56 obtains the reception level based on the level control information obtained from the reception unit 54 and the demodulation unit 55 (step S103). Also, the reception level measurement unit 56 outputs reception level information indicating the obtained reception level to the reception monitor unit 58.

Meanwhile, the reception CN value measurement unit 57 receives the baseband signal of QAM demodulated by the demodulation unit 55 and obtains a value of a CN ratio (Carrier to Noise ratio) of the reception signal of the V-polarization wave from the baseband signal to determine reception quality (step S104).

Also, the reception CN value measurement unit 57 acquires reception CN value information indicating the obtained value of the reception CN ratio and modulation method information indicating the modulation method for the demodulated signal, and outputs the information to the reception monitor unit 58.

The reception monitor unit 58 receives the reception level information input from the reception level measurement unit 56 of the V-polarization wave processing unit 50 and the reception CN value information input from the reception CN value measurement unit 57 of the V-polarization wave processing unit 50, and receives the reception level information of the H-polarization wave from the H-polarization wave processing unit 60 (step S105). The reception monitor unit 58 generates modulation method information and transmission power information of the signal transmitted from the wireless station device 1 based on the reception level information and the reception CN value information detected by the V-polarization wave processing unit 50 and the reception level information detected by the H-polarization wave processing unit 60.

The modulation method information and the transmission power information are generated according to the reception level information and the reception CN value, as follows.

<When the Reception Level is Low in at Least any One of the V-Polarization Wave and the H-Polarization Wave>

First, the reception monitor unit 58 detects the reception level of the respective polarization wave from the reception level information of the V-polarization wave and the reception level information of the H-polarization wave which are input (step S106), and determines whether the reception level of one or both of the polarization wave is lower than a previously determined threshold value (step S107). Here, when the reception level of one or both of the V-polarization wave and the H-polarization wave is lower than the previously determined threshold value, the reception CN value is likely to become small, line quality is likely to be bad, and a bit error is likely to be generated. Therefore, in this case, the reception monitor unit 58 generates the transmission power information for setting the transmission power of the signal transmitted from the wireless station device 1 to be high (step S108).

Even when the reception level of any one polarization wave is low, the reception monitor unit 58 generates the transmission power information to increase the transmission powers of both the V-polarization wave and the H-polarization wave. More specifically, for example, when the reception level is lower than the previously determined threshold value, the reception monitor unit 58 reads information of the transmission power according to a difference between the reception level indicated by the threshold value and a real reception level from a correspondence table recorded in a memory or the like, and generates transmission power information indicating the transmission power. Or, the reception monitor unit 58 may calculate transmission power using any calculation equation based on the information of the transmission power according to the difference between the reception level indicated by the threshold value and the real reception level, and generate transmission power information indicating the transmission power. Also, the reception monitor unit 58 transfers the generated transmission power information to the modulation unit 51 to be superimposed on the transmission signal and transmitted to the wireless station device 1 (step S109).

<When the Reception CN Value is Low>

The reception level of both or only one of the polarization waves may be reduced under the influence of fading of the V-polarization wave and the H-polarization wave orthogonal to each other between the respective facing wireless station devices which transmit or receive signals using a cross-polarization transmission scheme.

When the fading is generated in only the V-polarization wave and therefore the reception level detected by the V-polarization wave processing unit 50 is reduced, transmission power control is first performed according to the process of "When the reception level is low in at least one of the V-polarization wave and the H-polarization wave" described above. Accordingly, the transmission powers of the signals of both the polarization waves transmitted from the wireless station device 1 are set to be high.

However, if the reception level of the signal of the V-polarization wave received by the wireless station device 2 is still low and the reception CN value on the V-polarization wave side is low even when transmission power of the signal transmitted from the wireless station device 1 is high, a bit error is likely to be generated and demodulation is likely to be difficult to demodulate in the present modulation method.

Further, even when the reception level of the signal of the V-polarization wave received by the wireless station device 2 is higher than the previously determined threshold value and it is not necessary to increase the transmission power, but the reception CN value on the V-polarization wave side is low, the reception CN value is likely to be reduced due to a large interference amount between cross-polarization waves, and a bit error is likely to be generated and demodulation is likely to be difficult to demodulate in the present modulation method. Therefore, on the V-polarization wave side, the multilevel number of the modulation method is switched based on the reception CN value calculated on the V-polarization wave side to generate modulation method information to prevent the signal on the V-polarization wave side from being suspended.

In other words, the reception monitor unit 58 then determines whether the reception level has become higher than a threshold value after step S109 described above (step S110). Also, when the reception level has not yet become higher than the threshold value, the reception monitor unit 58 determines whether the reception CN value is a value lower than the first threshold value (step S111). Also, when the reception CN value is lower than the first threshold value, the reception monitor unit 58 determines a present modulation method for the received reception signal of the V-polarization wave (step S112), determines that the modulation method is to be changed to a modulation method with a reduced multilevel number (step S113), and generates modulation method information indicating the modulation method with a reduced multilevel number (step S114). Also, the reception monitor unit 58 transfers the generated modulation method information to the modulation unit 51 to be superimposed on the transmission signal and transmitted to the wireless station device 1 (step S115).

<When the Reception Levels of Both Polarization Waves are High and the Reception CN Value is High>

When it is determined that the reception level is equal to or more than the threshold value in step S107 described above, the reception monitor unit 58 then determines whether the reception CN value of the reception signal of the V-polarization wave is equal to or more than a second threshold value (the first threshold value<the second threshold value) (step S116). Also, when the reception CN value of the reception signal of the V-polarization wave is equal to or more than the second threshold value, the reception monitor unit 58 determines a present modulation method for the received reception signal of the V-polarization wave (step S117) and determines whether operation is possible in the modulation method with an increased multilevel in comparison with the present modulation method (step S118). Also, if the operation is possible in the modulation method with an increased multilevel number in comparison with the present modulation method, the reception monitor unit 58 determines to change to the modulation method with an increased multilevel number in comparison with the present modulation method (step S119). Also, the reception monitor unit 58 transfers the generated modulation method information to the modulation unit 51 to be superimposed on the transmission signal and transmitted to the wireless station device 1 (step S120).

Further, when the reception level is sufficiently high even in a state in which the multilevel number of the modulation increases with both polarization waves, the reception monitor unit 58 may generate transmission power information to decrease the transmission power. In this case, the reception monitor unit 58 transfers the generated transmission power information to the modulation unit 51 to be superimposed on the transmission signal and transmitted to the wireless station device 1 in the process of step S120. Further, the reception monitor unit 58 outputs the generated transmission power information to the reception monitor unit 68 of the H-polarization wave processing unit 60 (step S121).

In parallel to the process of steps S101 to S121 in the V-polarization wave processing unit 50 of the wireless station device 2 described above, the H-polarization wave processing unit 60 of the wireless station device 2 independently detects the reception CN value of the H-polarization wave.

Next, a process flow of the H-polarization wave processing unit will be described.

The reception signal of the H-polarization wave separated by the polarization multiplexer/demultiplexer 71 is amplified and converted to a signal in an intermediate frequency band by the reception unit 64 of the H-polarization wave processing unit 60 (step S201). Also, an output from the reception unit 64 is input to the demodulation unit 65. The demodulation unit 65 demodulates the input signal into a digital signal of QAM (quadrature amplitude modulation) (step S202) and outputs the digital signal as a demodulation baseband signal. Also, the reception level measurement unit 66 obtains the reception level based on level control information obtained from the reception unit 64 and the demodulation unit 65 (step S203). Also, the reception level measurement unit 66 outputs reception level information indicating the obtained reception level to the V-polarization wave processing unit 50 (step S204).

Further, the reception CN value measurement unit 67 receives the baseband signal of QAM demodulated by the demodulation unit 65, and obtains a value of a CN ratio (Carrier to Noise ratio) of the reception signal of the H-polarization wave from the baseband signal to determine reception quality (step S205).

Also, the reception CN value measurement unit 67 acquires reception CN value information indicating the obtained value of the reception CN ratio and modulation method information indicating a modulation method for the demodulated signal, and outputs the information to the reception monitor unit 68.

The reception monitor unit 68 receives the reception CN value information and the modulation method information input from the reception CN value measurement unit 67 of the H-polarization wave processing unit 60 (step S206). Further, the reception monitor unit 68 receives the transmission power information generated by the reception monitor unit 58 from the V-polarization wave processing unit 50 (step S207). Also, the reception monitor unit 68 determines whether the input reception CN value information of the H-polarization wave is lower than a third threshold value (step S208). Also, when the reception CN value of the H-polarization wave is lower than the third threshold value, the reception monitor unit 68 determines a present modulation method for the received reception signal of the H-polarization wave (step S209), determines that the modulation method is to be changed to a modulation method with a reduced multilevel number (step S210), and generates modulation method information indicating the modulation method with a reduced multilevel number (step S211). Also, the reception monitor unit 68 transfers the generated modulation method information and the transmission power information input from the V-polarization wave processing unit 50 to the modulation unit 61 to be superimposed on the transmission signal and transmitted to the wireless station device 1 (step S212).

When it is determined that the reception CN value is equal to or more than the third threshold value in step S208 described above, the reception monitor unit 68 then determines whether the reception CN value of the reception signal of the H-polarization wave is equal to or more than a fourth threshold value (the third threshold value<the fourth threshold value) (step S213). Also, when the reception CN value of the reception signal of the H-polarization wave is equal to or more than the fourth threshold value, there is no influence of fading occurring in the V-polarization wave, the cross-polar interference amount from the V-polarization wave side is small, and there is a reception CN value which can be demodulated in the present modulation method. Therefore, the reception monitor unit 68 determines a present modulation method for the received reception signal of the H-polarization wave without reducing the multilevel number of the modulation method (step S214), and determines to change to a modulation method with an increased multilevel number in comparison with the multilevel number of the modulation method (step S215). Also, the reception monitor unit 68 transfers the generated modulation method information to the modulation unit 61 to be superimposed on the transmission signal and transmitted to the wireless station device 1 (step S216).

Next, operation of the wireless station device on the transmission side will be described.

In the wireless station device 1 on the transmission side, a transmission signal from the wireless station device 2 is received by the antenna 32 and separated into reception signals of a V-polarization wave and an H-polarization wave by the polarization multiplexer/demultiplexer 31. Also, the reception signal of the V-polarization wave separated by the polarization multiplexer/demultiplexer 31 will be described. The reception signal of the V-polarization wave via the reception unit 14 is demodulated by the demodulation unit 15. Also, the demodulation unit 15 extracts the modulation method information and the transmission power information of the V-polarization wave sent from the wireless station device 2, and outputs the modulation method information to the modulation unit 11 and the transmission power information of the V-polarization wave sent from the wireless station device 2 to the transmission power control unit 13. Also, the modulation unit 11 changes the modulation method based on the modulation method information of the V-polarization wave. Further, the transmission power control unit 13 controls the transmission power based on the transmission power information of the V-polarization wave.

Meanwhile, the reception signal of the H-polarization wave separated by the polarization multiplexer/demultiplexer 31 will be described. The reception signal of the H-polarization wave via the reception unit 24 of the H-polarization wave processing unit 20 is demodulated by the demodulation unit 25. Also, the demodulation unit 25 extracts the modulation method information and the transmission power information of the H-polarization wave sent from the wireless station device 2, and outputs the modulation method information to the modulation unit 21 and the transmission power information of the V-polarization wave sent from the wireless station device 2 to the transmission power control unit 23. Also, the modulation unit 21 changes the modulation method based on the modulation method information of the H-polarization wave. Further, the transmission power control unit 23 controls the transmission power based on the transmission power information of the H-polarization wave.

According to the cross-polar interference cancellation system described above, when only the reception level of any one of the V-polarization wave and the H-polarization wave is reduced and the reception CN value is reduced due to interference between cross-polarization waves, or the like, the signal is suspended, and the signal of the one polarization wave cannot be transmitted at all. In this case, a process of reducing the multilevel number of the modulation method is also performed when the reception CN value is reduced.

Accordingly, in the cross-polar interference cancellation system of the present embodiment, the tolerance against the interference is enhanced. Therefore, even when no signal can be transmitted at all in the modulation method before the multilevel number is reduced, the signal can be passed by reducing the multilevel number. In this case, a transmission capacity is decreased, but a signal can be transmitted to some extent. Further, it is possible to perform transmission with a greater transmission capacity by determining the modulation method from the respective reception CN values independently in the V-polarization wave and the H-polarization wave.

Further, in the above-described process, states of the transmission path characteristics are recognized by monitoring the reception level together with the reception CN value, but the transmission power control and the modulation method control can be performed by monitoring only the reception CN value.

Further, in the wireless station device 2, the H-polarization wave processing unit 60 may perform a process similar to the process of the V-polarization wave processing unit 50 described above using the information of the H-polarization wave, and the V-polarization wave processing unit 50 may perform a process similar to the process of the H-polarization wave processing unit 60 described above using the information of the V-polarization wave.

Hereinafter, a process flow in this case will be described.

First, the wireless station device 2 receives the radio signal transmitted from the wireless station device 1. In the wireless station device 2, a radio signal is received by the antenna 72 and separated into two reception signals of the V-polarization wave and the H-polarization wave by the polarization multiplexer/demultiplexer 71.

The reception signal of the H-polarization wave separated by the polarization multiplexer/demultiplexer 71 is amplified and converted to a signal in an intermediate frequency band by the reception unit 64 of the H-polarization wave processing unit 60 (step S301). Also, an output from the reception unit 64 is input to the demodulation unit 65. The demodulation unit 65 demodulates the input signal to a digital signal of QAM (step S302) and outputs the digital signal as a demodulation baseband signal. Also, the reception level measurement unit 66 obtains a reception level based on level control information obtained from the reception unit 64 and the demodulation unit 65 (step S303). Also, the reception level measurement unit 66 outputs reception level information indicating the obtained reception level to the reception monitor unit 68.

Meanwhile, the reception CN value measurement unit 67 receives the baseband signal of QAM demodulated by the demodulation unit 65, and obtains a value of the CN ratio of the reception signal of the H-polarization wave from the baseband signal to determine reception quality (step S304). Also, the reception CN value measurement unit 67 acquires reception CN value information indicating the obtained value of the reception CN ratio and modulation method information indicating the modulation method for the demodulated signal, and outputs the information to the reception monitor unit 68.

The reception monitor unit 68 receives the reception level information input from the reception level measurement unit 66 of the H-polarization wave processing unit 60 and the reception CN value information input from the reception CN value measurement unit 67 of the H-polarization wave processing unit 60, and receives the reception level information of the V-polarization wave from the V-polarization wave processing unit 50 (step S305). The reception monitor unit 68 generates modulation method information and transmission power information of the signal transmitted from the wireless station device 1 based on the reception level information and the reception CN value information detected by the H-polarization wave processing unit 60 and the reception level information detected by the V-polarization wave processing unit 50.

The modulation method information and the transmission power information are generated according to the reception level information and the reception CN value, as follows.

<When the Reception Level is Low in at Least One of the V-Polarization Wave and the H-Polarization Wave>

First, the reception monitor unit 68 detects the reception levels of the respective polarization waves from the reception level information of the H-polarization wave and the reception level information of the V-polarization wave that are input (step S306), and determines whether the reception level of one or both of the polarization waves is lower than a previously determined threshold value (step S307). Here, when the reception level of one or both of the polarization waves is lower than the previously determined threshold value, the reception CN value is likely to be reduced, line quality is likely to be bad, and a bit error is likely to be generated. Therefore, in this case, the reception monitor unit 68 generates the transmission power information for setting the transmission power of the signal transmitted from the wireless station device 1 to be high (step S308).

Even when the reception level of any one polarization wave is low, the reception monitor unit 68 generates the transmission power information to increase the transmission powers of both of the H-polarization wave and the V-polarization wave. More specifically, for example, when the reception level is lower than a previously determined threshold value, the reception monitor unit 68 reads information of the transmission power according to the difference between the reception level indicated by the threshold value and the real reception level from a correspondence table recorded in a memory or the like, and generates transmission power information indicating the transmission power. Or, the reception monitor unit 68 may calculate the transmission power using any calculation equation based on the information of the transmission power according to the difference between the reception level indicated by the threshold value and the real reception level, and generate the transmission power information indicating the transmission power. Also, the reception monitor unit 68 transfers the generated transmission power information to the modulation unit 61 to be superimposed on the transmission signal and transmitted to the wireless station device 1 (step S309).

<When the Reception CN Value is Low>

The reception level of both or only one of the polarization waves may be reduced under the influence of fading of the V-polarization wave and the H-polarization wave orthogonal to each other between the respective facing wireless station devices which transmit or receive signals using a cross-polarization transmission scheme.

When the fading occurs only in the H-polarization wave and therefore the reception level detected by the H-polarization wave processing unit 60 is reduced, transmission power control is first performed according to a process of "When the reception level is reduced in at least one of the V-polarization wave and the H-polarization wave" described above. Accordingly, the transmission powers of the signals of both the polarization waves transmitted from the wireless station device 1 are set to be high.

However, if the reception level of the signal of the H-polarization wave received by the wireless station device 2 is still low and the reception CN value on the H-polarization wave side is low even when transmission power of the signal transmitted from the wireless station device 1 is increased, the bit error is likely to be generated and demodulation is likely to be difficult to perform in the present modulation method.

Further, even when the reception level of the signal of the H-polarization wave received by the wireless station device 2 is higher than the previously determined threshold value and it is not necessary to increase the transmission power, but the reception CN value of the H-polarization wave is low, the reception CN value is likely to be reduced due to a large interference amount between the cross-polarization wave, the bit error is likely to be generated, and the demodulation is likely to be difficult to perform in the present modulation method. Therefore, on the H-polarization wave side, the multilevel number of the modulation method is switched based on the reception CN value calculated on the H-polarization wave side to generate modulation method information, such that the signal of the H-polarization wave is prevented from being suspended.

In other words, the reception monitor unit 68 then determines whether the reception level of the H-polarization wave has become higher than the threshold value after step S309 described above (step S310). Also, when the reception level of the H-polarization wave has not yet become higher than the threshold value, the reception monitor unit 68 determines whether the reception CN value is a value lower than the first threshold value (step S311). Also, when the reception CN value is lower than the first threshold value, the reception monitor unit 68 determines a present modulation method for the received reception signal of the H-polarization wave (step S312), determines that the modulation method is changed to a modulation method with a reduced multilevel number (step S313,) and generates modulation method information indicating the modulation method with a reduced multilevel number (step S314). Also, the reception monitor unit 68 transfers the generated modulation method information to the modulation unit 61 to be superimposed on the transmission signal and transmitted to the wireless station device 1 (step S315).

<When the Reception Levels of Both the Polarization Waves are High and the Reception CN Value is High>

When it is determined in step S307 described above that the reception level is equal to or more than the threshold value, the reception monitor unit 68 then determines whether the reception CN value of the reception signal of the H-polarization wave is equal to or more than the second threshold value (the first threshold value<the second threshold value) (step S316). Also, when the reception CN value of the reception signal of the H-polarization wave is equal to or more than the second threshold value, the reception monitor unit 58 determines a present modulation method for the received reception signal of the H-polarization wave (step S317), and determines whether operation is possible in a modulation method for an increased multilevel in comparison with the present modulation method (step S318). Also, if operation is possible in the modulation method for an increased multilevel in comparison with the present modulation method, the reception monitor unit 68 determines to change to the modulation method with an increased multilevel number in comparison with the multilevel number of the present modulation method (step S319). Also, the reception monitor unit 68 transfers the generated modulation method information to the modulation unit 61 to be superimposed on the transmission signal and transmitted to the wireless station device 1 (step S320).

Further, the reception monitor unit 68 may generate transmission power information to decrease the transmission power when the reception level is sufficiently high even in a state in which the multilevel number of the modulation has increased with both of the polarization waves. In this case, the reception monitor unit 68 transfers the generated transmission power information to the modulation unit 61 to be superimposed on the transmission signal and transmitted to the wireless station device 1 in the process of step S320. Further, the reception monitor unit 68 outputs the generated transmission power information to the reception monitor unit 58 of the V-polarization wave processing unit 50 (step S321).

In parallel to the process of steps S301 to S321 described above in the H-polarization wave processing unit 60 of the wireless station device 2, the V-polarization wave processing unit 50 of the wireless station device 2 independently detects the reception CN value of the V-polarization wave.

Next, a process flow of the V-polarization wave processing unit will be described.

The reception signal of the V-polarization wave separated by the polarization multiplexer/demultiplexer 71 is amplified and converted to a signal in an intermediate frequency band by the reception unit 54 of the V-polarization wave processing unit 50 (step S401). Also, an output from the reception unit 54 is input to the demodulation unit 55. The demodulation unit 55 demodulates the input signal to a digital signal of QAM (step S402), and outputs the digital signal as a demodulation baseband signal. Also, the reception level measurement unit 56 obtains the reception level based on the level control information obtained from the reception unit 54 and the demodulation unit 55 (step S403). Also, the reception level measurement unit 56 outputs the reception level information indicating the obtained reception level to the H-polarization wave processing unit 60 (step S404).

Further, the reception CN value measurement unit 57 receives the baseband signal of QAM demodulated by the demodulation unit 55, and obtains a value of a CN ratio of the reception signal of the V-polarization wave in order to determine reception quality from the baseband signal (step S405). Also, the reception CN value measurement unit 57 acquires reception CN value information indicating the obtained value of the reception CN ratio and modulation method information indicating the modulation method for the demodulated signal, and outputs the information to the reception monitor unit 68.

The reception monitor unit 58 receives the reception CN value information and the modulation method information input from the reception CN value measurement unit 57 of the V-polarization wave processing unit 50 (step S406). Further, the reception monitor unit 58 receives the transmission power information generated by the reception monitor unit 68 from the H-polarization wave processing unit 60 (step S407). Also, the reception monitor unit 58 determines whether the input reception CN value information of the V-polarization wave is lower than a third threshold value (step S408). Also, when the reception CN value of the V-polarization wave is lower than the third threshold value, the reception monitor unit 68 determines a present modulation method for the received reception signal of the V-polarization wave (step S409), determines that the modulation method is to be changed to a modulation method with a reduced multilevel number (step S410), and generates modulation method information indicating the modulation method with a reduced multilevel number (step S411). Also, the reception monitor unit 58 transfers the generated modulation method information and the transmission power information input from H-polarization wave processing unit 60 to the modulation unit 51 to be superimposed on the transmission signal and transmitted to the wireless station device 1 (step S412).

When it is determined that the reception CN value is equal to or more than the third threshold value in step S408 described above, the reception monitor unit 58 then determines whether the reception CN value of the reception signal of the V-polarization wave is equal to or more than a fourth threshold value (the third threshold value<the fourth threshold value) (step S413). Also, when the reception CN value of the reception signal of the V-polarization wave is equal to or more than the fourth threshold value, there is no influence of fading occurring in the H-polarization wave, a cross-polar interference amount from the H-polarization wave side is small, and there is the reception CN value which can be demodulated in the present modulation method. Therefore, the reception monitor unit 58 determines a present modulation method for the received reception signal of the V-polarization wave without reducing the multilevel number of the modulation method (step S414), and determines to change to a modulation method with an increased multilevel number in comparison with the multilevel number of such a modulation method (step S415). Also, the reception monitor unit 68 transfers the generated modulation method information to the modulation unit 61 to be superimposed on the transmission signal and transmitted to the wireless station device 1 (step S416).

Further, the wireless station device 1 and the wireless station device 2 in the cross-polar interference cancellation system described above include a computer system including an LSI (Large Scale Integration) therein. Also, a procedure of each process described above is stored in the form of a program in a computer-readable recording medium, and the process is performed by the computer reading and executing this program. Here, the computer-readable recording medium refers to a magnetic disk, a magnetic optical disc, a CD-ROM, a DVD-ROM, a semiconductor memory, or the like. Further, this computer program may be distributed to the computer via a communication line and the computer receiving the distribution may execute the program.

Further, the program may be a program for realizing some of the above-described functions.

Alternatively, the program may be a program capable of realizing the above-described functions through a combination with a program previously stored in a computer system, i.e., a differential file (a differential program).

Priority is claimed on Japanese Patent Application No. 2011-146979, filed Jul. 1, 2011, the content of which is incorporated herein by reference.

Industrial Applicability

With the present invention, it is possible to enhance tolerance against interference and perform transmission with a greater transmission capacity in a cross-polar interference cancellation system.

[Description Of Reference Symbols]
  1 wireless station device
  2 wireless station device
  11 modulation unit
  12 transmission unit
  13 transmission power control unit
  14 reception unit
  15 demodulation unit
  16 reception level measurement unit
  17 reception CN value measurement unit 18 reception monitor unit
21 modulation unit
22 transmission unit
23 transmission power control unit
24 reception unit
25 demodulation unit
26 reception level measurement unit
27 reception CN value measurement unit
28 reception monitor unit
51 modulation unit
52 transmission unit
53 transmission power control unit
54 reception unit
55 demodulation unit
56 reception level measurement unit
57 reception CN value measurement unit
58 reception monitor unit
61 modulation unit
62 transmission unit
63 transmission power control unit
64 reception unit
65 demodulation unit
66 reception level measurement unit
67 reception CN value measurement unit
68 reception monitor unit

The invention claimed is:

1. A cross-polar interference cancellation system including a wireless station device which performs a transmission and reception process with a facing wireless station device in two channels using both of a vertical polarization wave and a horizontal polarization wave of a radio signal at a same frequency,
wherein the wireless station device:
determines whether a carrier to noise ratio of any one of the vertical polarization wave and the horizontal polarization wave is lower than a first threshold value;
determines that a present modulation method of any one of the vertical polarization wave and the horizontal polarization wave having the carrier to noise ratio that has been determined to be lower than the first threshold value is to be changed to another modulation method having another multilevel number smaller than a present multilevel number of the present modulation method when the carrier to noise ratio of any one of the vertical polarization wave and the horizontal polarization wave is lower than the first threshold value;
generates modulation method information indicating the other modulation method with the other multilevel number; and
transmits the modulation method information indicating the other modulation method with the other multilevel number to the facing wireless station device, and
wherein the facing wireless station device receives the modulation method information indicating the other modulation method with the other multilevel number, and transmits a radio signal to the wireless station device using the modulation method indicated by the received modulation method information for the vertical polarization wave or the horizontal polarization wave having the carrier to noise ratio that has been determined to be lower than the first threshold value in the wireless station device.

2. The cross-polar interference cancellation system according to claim 1, wherein the wireless station device further:
determines whether a reception level of any one of the vertical polarization wave and the horizontal polarization wave is lower than a reception level threshold value;
generates transmission power information instructing to set a transmission level of the radio signal in the facing wireless station device to be high when the reception level of any one of the vertical polarization wave and the horizontal polarization wave is lower than the reception level threshold value; and
transmits the transmission power information to the facing wireless station device, and
wherein the facing wireless station device receives the transmission power information, increases the transmission power based on the received transmission power information, and transmits a radio signal to the wireless station device.

3. The cross-polar interference cancellation system according to claim 2, wherein the wireless station device further determines whether a carrier to noise ratio of any one of the vertical polarization wave and the horizontal polarization wave is lower than a first threshold value when the reception level of any one of the vertical polarization wave and the horizontal polarization wave is lower than the reception level threshold value even when the wireless station device transmits the transmission power information to the facing wireless station device.

4. The cross-polar interference cancellation system according to claim 3, wherein the wireless station device further:
determines that the present modulation method for any one of the vertical polarization wave and the horizontal polarization wave determined to be equal to or more than a second threshold value higher than the first threshold value is to be changed to another modulation method with a number of phase shift values when the reception level of any one of the vertical polarization wave and the horizontal polarization wave is equal to or more than the reception level threshold value, and a carrier to noise ratio of any one of the vertical polarization wave and the horizontal polarization wave is equal to or more than the second threshold value higher than the first threshold value;
generates modulation method information indicating the other modulation method with a number of phase shifts; and
transmits the modulation method information indicating the other modulation method with a number of phase shifts to the facing wireless station device, and
wherein the facing wireless station device receives the modulation method information indicating the other modulation method with a number of phase shifts, and transmits a radio signal to the wireless station device using the modulation method indicated by the received modulation method information for the vertical polarization wave or the horizontal polarization wave determined to be equal to or more than the second threshold value in the wireless station device.

5. A wireless station device which performs a transmission and reception process with a facing wireless station device in two channels using both of a vertical polarization wave and a horizontal polarization wave of a radio signal at a same frequency, wherein the wireless station device
  determines whether a carrier to noise ratio of any one of the vertical polarization wave and the horizontal polarization wave is lower than a first threshold value;
  determines that a present modulation method of any one of the vertical polarization wave and the horizontal polarization wave having the carrier to noise ratio that has been determined to be lower than the first threshold value is to be changed to another modulation method having another multilevel number smaller than a present multilevel number of the present modulation method when the carrier to noise ratio of any one of the vertical polarization wave and the horizontal polarization wave is lower than the first threshold value;
  generates modulation method information indicating the other modulation method with the other multilevel number; and
  transmits the modulation method information indicating the other modulation method with the other multilevel number to the facing wireless station device.

6. The wireless station device according to claim 5, wherein the wireless station device further:
  determines whether a reception level of any one of the vertical polarization wave and the horizontal polarization wave is lower than a reception level threshold value;
  generates transmission power information instructing to set a transmission level of the radio signal in the facing wireless station device to be high when the reception level of any one of the vertical polarization wave and the horizontal polarization wave is lower than the reception level threshold value; and
  transmits the transmission power information to the facing wireless station device.

7. The wireless station device according to claim 6, wherein the wireless station device further determines whether a carrier to noise ratio of any one of the vertical polarization wave and the horizontal polarization wave is lower than a first threshold value when the reception level of any one of the vertical polarization wave and the horizontal polarization wave is lower than the reception level threshold value even when the wireless station device transmits the transmission power information to the facing wireless station device.

8. The wireless station device according to claim 7, wherein the wireless station device further:
  determines that the present modulation method for any one of the vertical polarization wave and the horizontal polarization wave determined to be equal to or more than a second threshold value higher than the first threshold value is to be changed to another modulation method with a number of phase shift values when the reception level of any one of the vertical polarization wave and the horizontal polarization wave is equal to or more than the reception level threshold value, and a carrier to noise ratio of any one of the vertical polarization wave and the horizontal polarization wave is equal to or more than the second threshold value higher than the first threshold value;
  generates modulation method information indicating the other modulation method with a number of phase shifts; and
  transmits the modulation method information indicating the other modulation method with a number of phase shifts to the facing wireless station device.

9. A wireless communication method in a cross-polar interference cancellation system including a wireless station device which performs a transmission and reception process with a facing wireless station device in two channels using both of a vertical polarization wave and a horizontal polarization wave of a radio signal at a same frequency,
  wherein the wireless station device:
    determines whether a carrier to noise ratio of any one of the vertical polarization wave and the horizontal polarization wave is lower than a first threshold value;
    determines that a present modulation method of any one of the vertical polarization wave and the horizontal polarization wave having the carrier to noise ratio that has been determined to be lower than the first threshold value is to be changed to another modulation method having another multilevel number smaller than a present multilevel number of the present modulation method when the carrier to noise ratio of any one of the vertical polarization wave and the horizontal polarization wave is lower than the first threshold value;
    generates modulation method information indicating the other modulation method with the other multilevel number; and
    transmits the modulation method information indicating the other modulation method with the other multilevel number to the facing wireless station device, and
  wherein the facing wireless station device receives the modulation method information indicating the other modulation method with the other multilevel number, and transmits a radio signal to the wireless station device using the modulation method indicated by the received modulation method information for the vertical polarization wave or the horizontal polarization wave having the carrier to noise ratio that has been determined to be lower than the first threshold value in the wireless station device.

10. A wireless communication method in a wireless station device which performs a transmission and reception process with a facing wireless station device in two channels using both of a vertical polarization wave and a horizontal polarization wave of a radio signal at the same frequency, the method comprising:
  determining whether a carrier to noise ratio of any one of the vertical polarization wave and the horizontal polarization wave is lower than a first threshold value;
  determining that a present modulation method of any one of the vertical polarization wave and the horizontal polarization wave having the carrier to noise ratio that has been determined to be lower than the first threshold value is to be changed to another modulation method having another multilevel number smaller than a present multilevel number of the present modulation method when the carrier to noise ratio of any one of the vertical polarization wave and the horizontal polarization wave is lower than the first threshold value;
  generating modulation method information indicating the other modulation method with the other multilevel number; and
  transmitting the modulation method information indicating the other modulation method with the other multilevel number to the facing wireless station device.

* * * * *